United States Patent [19]

Galand et al.

[11] Patent Number: 5,568,477

[45] Date of Patent: Oct. 22, 1996

[54] MULTIPURPOSE PACKET SWITCHING NODE FOR A DATA COMMUNICATION NETWORK

[75] Inventors: Claude Galand, Cagnes-Sur-Mer; Xavier Jacquart; Gerald Lebizay, both of Vence, all of France; Jean-yves Leboudec, Jouxtens-mezery, Switzerland; Philippe Louis, Nice, France; Clement Poiraud, Cagnes Sur Mer, France; Eric S. Georges, La Gaude, France; Victor Spagnol, Cagnes-Sur-mer, France; Edward Suffern, Chapel Hill, N.C.; Hong L. Truong, Richterswil, Switzerland

[73] Assignee: International Business Machines Corporation, Armonk, N.Y.

[21] Appl. No.: 495,774

[22] Filed: Jun. 27, 1995

[30] Foreign Application Priority Data

Dec. 20, 1994 [EP] European Pat. Off. ............. 94480178

[51] Int. Cl.⁶ .............................. H04Q 11/04; H04J 3/24
[52] U.S. Cl. ........................ 370/60; 370/94.1; 370/85.13
[58] Field of Search ........................... 370/60, 94.1, 60.1, 370/85.13, 99, 94.2

[56] References Cited

U.S. PATENT DOCUMENTS

| | | | |
|---|---|---|---|
| 5,007,045 | 4/1991 | Tsuzuki | 370/94.1 |
| 5,101,404 | 3/1992 | Kunimoto et al. | 370/60 |
| 5,237,569 | 8/1993 | Sekihata et al. | 370/94.1 |

OTHER PUBLICATIONS

International Zurich Seminar on Digital Communications, 5 Mar. 1990, Zurich XP000315092, H. Schneider "The Concept of Virtual Paths and Virtual Channels in ATM–Networks".

Patent Abstracts of Japan vol. 17, No. 676 (E–1475) 13 Dec. 1993 & JP-A-05 227 211 (Fujitsu) 3 Sep. 1993 "Packet Switching System".

Patent Abstracts of Japan vol. 17, No. 101 (E–1327) 2 Mar. 1993 & JP-A-04 291 548 (Fujitsu) 15 Oct. 1992 "High Speed Large Capacity Matrix Type time Division Label Exchange System".

WO-A-92 17014 (GPT Limited) "Connectionless Switching for ATM Switch".

WO-A-93 20634 (Northern Telecom Limited) "Method for ATM Switch Core Interface".

*Primary Examiner*—Douglas W. Olms
*Assistant Examiner*—Matthew C. Phillips
*Attorney, Agent, or Firm*—Gerald R. Woods

[57] ABSTRACT

A multipurpose data communication network node for interconnecting both ATM and Variable Length (VL) input/output trunks with all combinations of node input versus output trunk connections. The network node includes ATM/VL Receive Adapters and ATM/VL Transmit Adapters, interconnected via a Switching device (44) operating on ATM like packets (i.e. ATM cells) only. The receive adapter includes means (41, 43) for deriving switchable cells from VL traffic possibly including ATM packets and provided over an input VL trunk and means (45, 46) for deriving switchable cells from ATM packets provided on input ATM trunk. The transmit adapter, includes means (47, 48) for reconstructing VL traffic to be fed onto an output VL trunk, and means (49, 50) for reconstructing ATM traffic to be fed onto an output ATM trunk; both means (47, 48) and (49, 50) being fed with switchable cells irrespective of the traffic origin, being it from VL or ATM trunks.

6 Claims, 10 Drawing Sheets

R_TPA - Receive Trunk Port Adapter
GPP - General Purpose Processor
R_SIA - Receive Switch Interface Adapter
X_SIA - Transmit SIA

MULTIPURPOSE PACKET SWITCHING NODE FOR A DATA COMMUNICATION NETWORK

FIELD OF THE INVENTION

This invention relates to data transmission network nodes, and more particularly to a multipurpose packet switching node for switching both Asynchronous Transfer Mode (ATM) packets and Variable Length (VL) packets over ATM or VL links (or trunks).

BACKGROUND OF THE INVENTION

Modern digital networks are designed to operate in a multimedia environment for transporting different types of data including pure data, such as files of alphanumeric characters, as well as voice, image, video signals, etc . . . The operation of the network should, naturally ensure compliance with a number of requirements specific to each kind of these signals.

For instance, information can be divided into different types. One type is non-real-time information, i.e. information that can be delivered to an end-user with minor time constraint restrictions. Another type is real-time information that must be delivered to the end-user with a predefined limited-delay restriction. If real-time information is not delivered to the end-user within the predefined time delay period, the information should simply be discarded.

On the other hand, applications using non-real-time information may recover from fairly large and variable time delays resulting from transport from source to destination. However, any loss of non-real-time data may become dramatic, even though techniques have been developed to deal with loss of data.

Different techniques have been developed for transporting data, such as packet switching techniques, wherein digitized data is arranged into so-called bit packets, and circuit switching techniques. The packets may either be of fixed length, e.g., Asynchronous Transfer Mode (ATM) packets, or variable length (VL) nature.

A basic advantage of packet switching over circuit switching is that packet switching permits statistical multiplexing of the different types of data over a link, which optimizes utilization of the transmission bandwidth. A drawback of packet switching compared to circuit switching is that packet switching may introduce jitter and delay in the transported information at the destination. As already noted, jitter or delay may be detrimental for transmission of isosynchronous data, like video or voice.

A basic data transmission network includes switching nodes interconnected by transmission links or trunks, for transporting data from end-users in a dynamic and optimal manner.

A packet switching network may be very complex in architecture and operation. The optimization of such a network requires that each network node be designed to be able to interconnect all kinds of trunks or links without distinction, while also being capable of discriminating between network control data and end user data so the two types of data may be processed appropriately.

SUMMARY OF THE INVENTION

Accordingly, this invention is meant to provide a multipurpose packet switching node able to switch packets received on any of a number of ATM and/or VL node input trunks to any of a number of ATM and/or VL node output trunks. The multipurpose packet switching node includes a switching fabric or device for switching fixed length switchable cells from any of multiple input ports to any of multiple output ports. The node further includes one or more receive adapters connected to input trunks to the node. Each receive adapter differentiates between native ATM packets, psuedo-ATM packets having standard ATM format but carrying segmented VL data, and VL packets and provides processing appropriate to the type of packet detected. Where the packet is to be switched to an output trunk by the switching device, the receive adapter assures that the received packet is converted to the pre-defined switchable cell format before it is presented to the switching device. The multipurpose packet switching node further includes one or more transmit adapters for accepting switchable cells from the switching device and reformatting those switchable cells to a packet format appropriate to the type of trunk (fixed or variable length) over which the data is to leave the node.

These and other objects, characteristics and advantages of this invention will become apparent from a consideration of the following detailed description when read with reference to the accompanying drawings, which specify and show a preferred embodiment of the invention.

DETAILED DESCRIPTION OF A PREFERRED EMBODIMENT OF THE INVENTION

Figure 1:
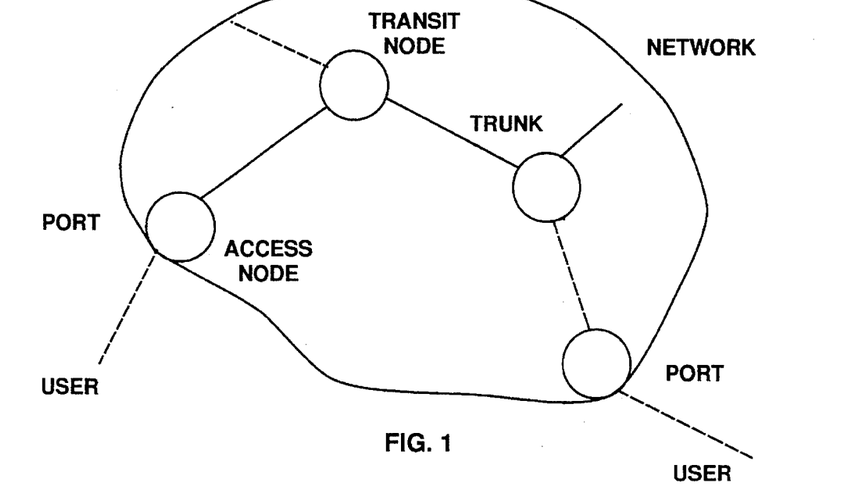
FIG. 1 represents a basic data communication network.

FIG. 1 illustrates an existing private network having leased lines including T1 and T3 class lines, which are conventionally called trunks, with the trunks linking together access and/or transit nodes. End users access the network through ports located in the access nodes. The end user data is processed by an access agent running in the port. An access agent has two primary functions. The first is to identify the protocol or format for the end user data. The second is to select and establish the data's path through network and to initiate the routing of the data through the network. The latter task is accomplished through the generation of a header, which is attached to the end user data, as shall be explained in the following description.

Figure 2:
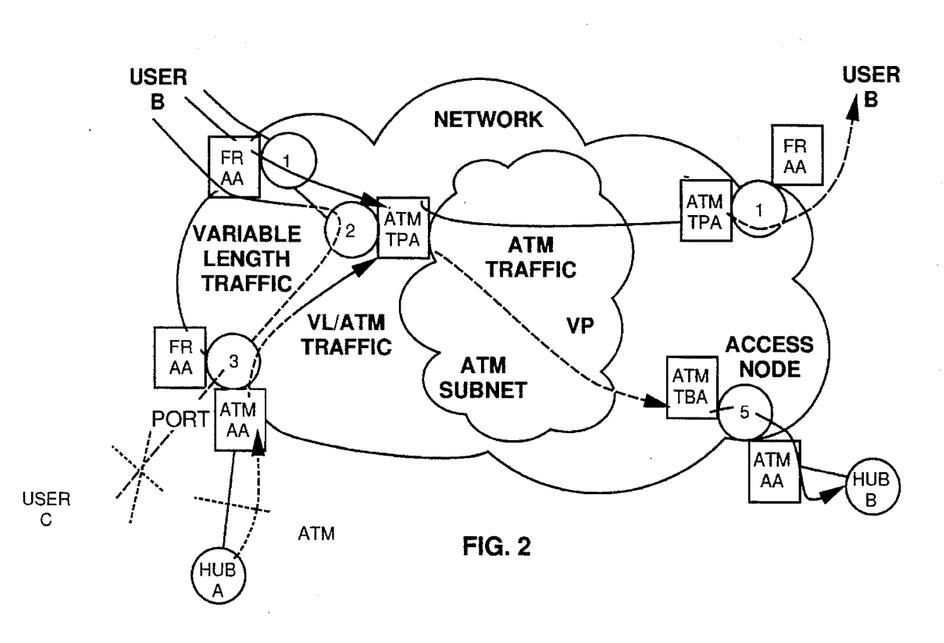
FIG. 2 represents a more complex data communication network suitable for nodes implementing the present invention.

A simple network, of the type described above, often evolves into a more complex network of the type shown in FIG. 2, which, in addition to leased lines, would support Frame Relay and Asynchronous Transfer Mode (ATM) sub-networks. The more complex network offers the possibility of carrying native ATM traffic as well as Variable Length (VL) traffic, which VL traffic may include both end user traffic and network control traffic.

There is a fundamental difference between end user and network control VL traffic. End user traffic is transported through the network along a given network path from a source end user to a target end user without affecting the operation of the network. Network control traffic should be addressed to specific nodes. Once decoded and executed by such nodes, this type of traffic controls the network architecture and operation.

Complex networks of the type illustrated in FIG. 2 may include carrier sub-networks and must be capable of fully complying with requirements of such sub-networks. In addition, variable length traffic may also include ATM type of traffic.

A standard ATM packet is organized into a data unit including a 48-byte long payload and a 5 byte long header for node to node connection and checking. A variable length packet is slightly more complex.

End user data is typically provided to the network as a variable number of bytes. Upon entering an access node through a given port, each variable length block of end user data is provided with an inter-node header constructed for routing the data between the consecutive network nodes and down to the final user. The contents of such a header depend on the type of routing selected by the network designer. Conventional routing methodologies include, for instance, Automatic Network Routing (ANR), label swapping or tree routing. Although a node implemented according to present invention may be used for most of these inter-node protocols, the following description assumes that label swapping is employed. Where label swapping is employed, an inter-node header includes two one byte long control blocks (CB1 and CB2), one two byte long label L1, and a validity control block, i.e. Linear Redundancy Checking (LRC) block. The combination of such a header with appended end user data creates a data unit designated as a VL packet.

In summary, any network node may receive data, including both VL packets and/or ATM packets over VL and/or ATM trunks and should be capable of switching such traffic from any input trunk to any output trunk, whether VL or ATM output trunks. The following description shall address one direction of communication through the network node, but it should be clear that communication in the other direction within the node (making the node operable in full duplex) derives immediately from the following description.

Figure 3:
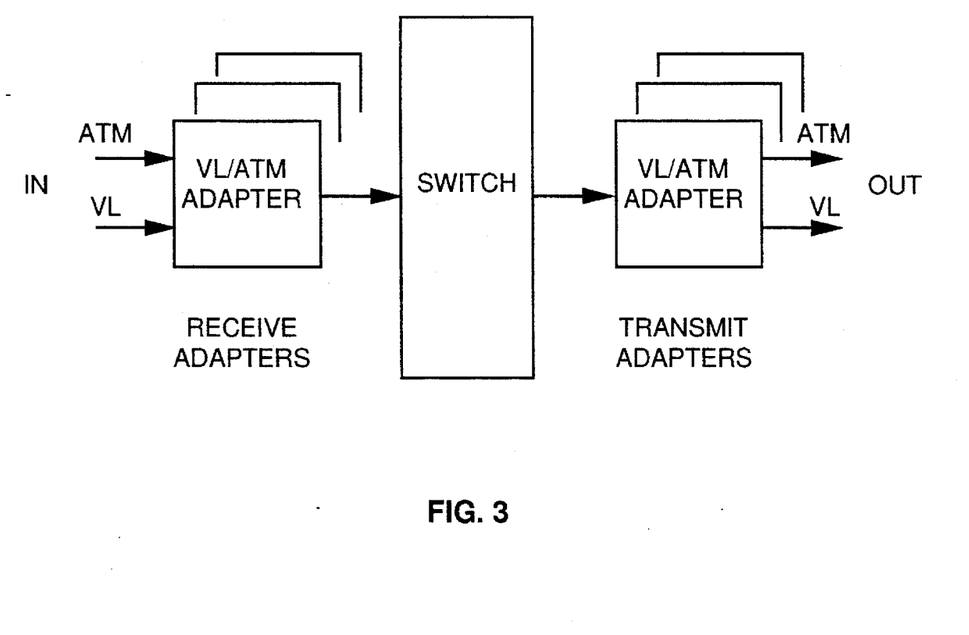
FIG. 3 is a simplified block diagram of a node which implements the present invention.

This invention provides for an optimized, multipurpose network node. The overall node architecture is schematically represented in FIG. 3. The network node is made to be connected to trunks which carry either ATM or VL packets through a set of receive adapters on one side and a set of transmit adapters on the other side. Both sets of adapters are interconnected in all possible combinations through a so-called ATM Switch made to process standard fixed length ATM cells only (herein simply referred to as ATM cells). Since the switch can handle only ATM cells, each received variable length packet is segmented in the node into ATM cells for switching purposes while received ATM traffic is switched almost directly.

For purposes of the following description, the term "switchable cell" is reserved for data units having the necessary format for switching within the multiport switching device. Data units which exist outside the switching device are referred to as "packets" and may be fixed length or variable length. Different possible formats for packets and the switchable cell format are described in detail below.

Within the node, all received traffic is arranged into a format including in addition to a conventional ATM- like packet (ATM header (5 bytes) and payload (48 bytes)), the following information:

a switch routing header (SRH) to route the ATM cells through the switch stages (e.g.: 3 bytes);

a control field (CNTL) for adapter to adapter protocol and switch microcontroller (e.g. 1 byte);

a Cyclical Redundancy Checking (CRC) field (e. g, 1 byte) appended to the payload data and made to support error checking for the ATM cell itself as the cell moves between switch receive and transmit interfaces.

Such a data unit shall be referred to as a switchable cell.

Figure 4:
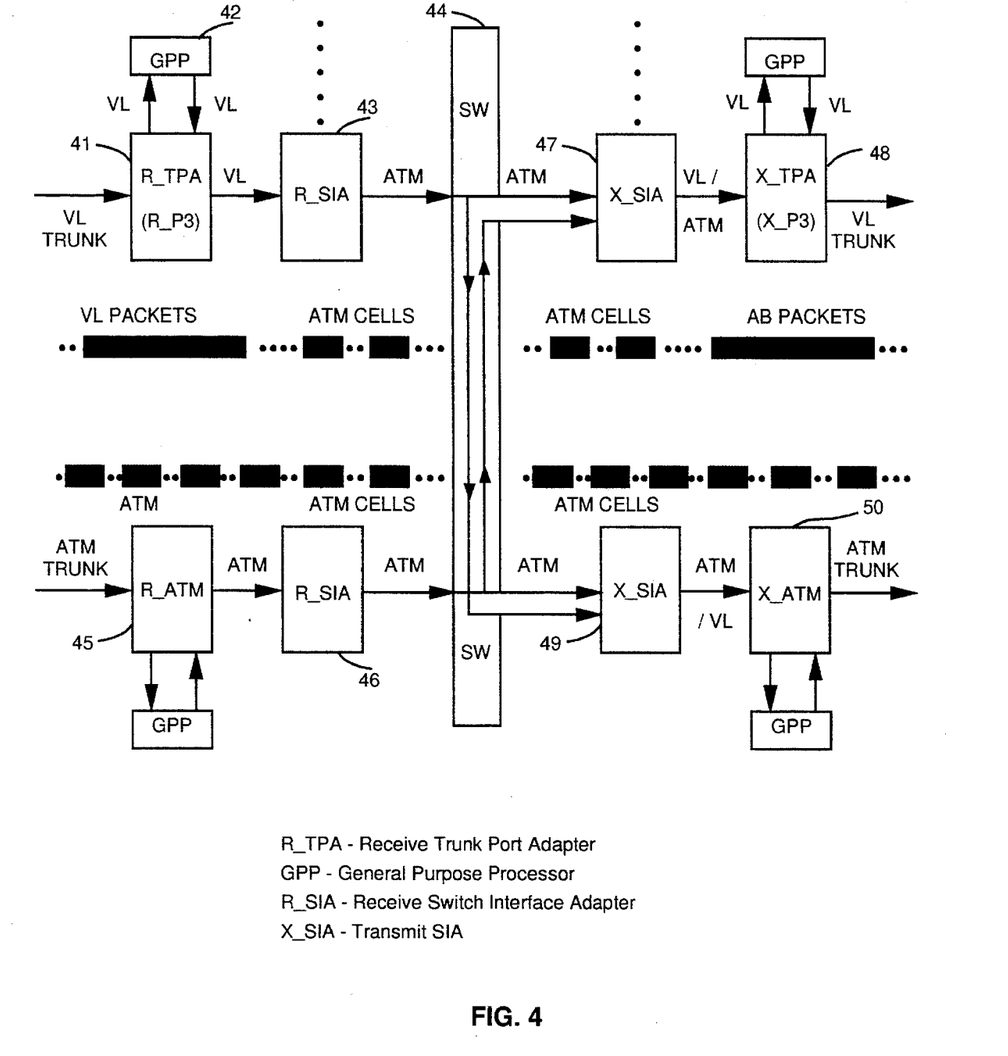
FIG. 4 is a detailed block diagram illustrating the node architecture.

FIG. 4 is a detailed block diagram of a node made according to the teaching of this invention. Each input VL trunk is connected to a receive adapter through a receive trunk/port adapter (R_TPA) 41. The R_TPA (41) is connected on one side to a general purpose processor GPP (42), which performs control operations, and on the other side, to a receive switch interface adapter R_SIA (43). Each input ATM trunk is connected to a receive trunk/port adapter R_ATM (45), the output of which is connected to a receive switch interface adapter R_SIA (46). All R_SIA's are connected to the switch device SW (44).

In order to drive a variable length mode output trunk on the switch output side, a transmit switch interface adapter X_SIA (47) drives a transmit trunk/port adapter X_TPA (48) also attached to a general purpose processor (GPP) to which network control operations are assigned. One of the functions to be performed by the transmit trunk/port adapter X_TPA (48) is to reassemble payloads from successive universally switchable cells to re-create a variable length packet. For driving an output ATM trunk, the node includes transmit switch interface adapter X_SIA (49) driving a transmit trunk/port adapter ATM, X_ATM (50), also provided with a general purpose processor for network control operations. Obviously, although a separate general purpose controller is illustrated for each trunk/port adapter, a single powerful processor might be used to support multiple trunk/port adapters.

The above node architecture enables switching of different types of packets among any possible combination of node input versus output trunks, making the node perfectly suited for use in a complex network such as the one represented in FIG. 2. Naturally, a node may also have multiple input or output trunks of the same or different kinds.

In operation, the receive trunk/port adapter R_TPA (41) receives VL or ATM packets and performs the following operations: LRC or HEC error checking, traffic discrimination and routing. The first function checks the integrity of the received packet header through conventional LRC/HEC processing. For each incoming VL packet, the LRC/HEC of the packet header is computed based on the packet payload and compared with the LRC/HEC character carried by the packet header. In case of mismatch, the packet is discarded.

In a preferred embodiment, routing is essentially based on label swapping in the packet header. Each label in a header is used to designate a node output through a stored table look-up operation. Label swapping is known. For more information on one implementation of label swapping, reference may be made to European Application No 94480097.8 filed on 7 Oct. 1994 by the assignee of the present invention, as well as to the following description.

Assume an input VL packet carries the incoming link reference (e.g. label L1). This link reference is used to address a connection table stored in the node interface processor. The table look-up operation first returns an outgoing link reference (e.g. L2) which is used to replace L1 in the packet header, while the LRC character is recomputed and replaced to complete the label swapping.

Figure 5:
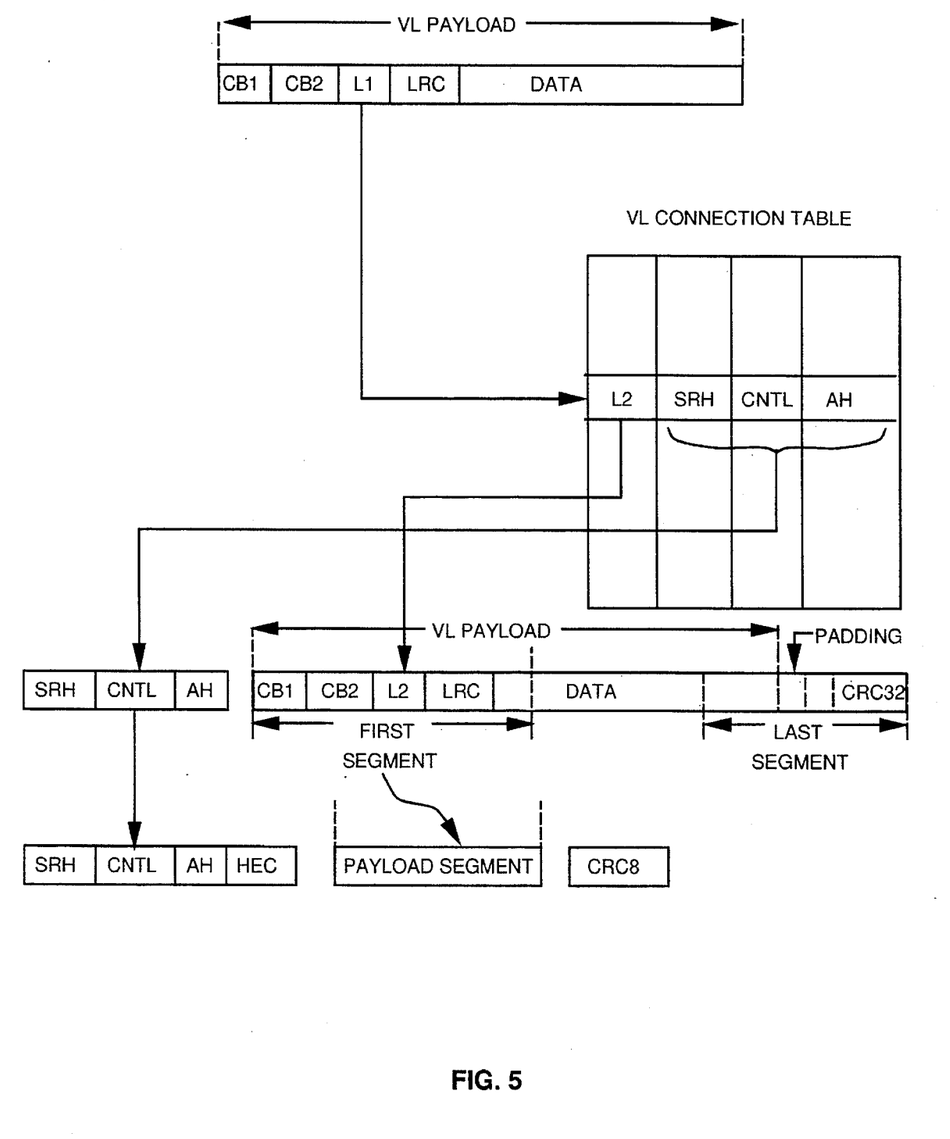
FIGS. 5 and 6 illustrate processing of message traffic within a node implementing the present invention.

These table look-up operations are illustrated in FIG. 5.

In addition to label swapping, routing of VL packets involves a mapping operation which provides a portion of an "ATM like header" (AH) field to be appended to the VL packet. The AH header field is used to generate a header checking word (HEC) in accordance with a predefined function of the AH function. The HEC word is appended to AH.

The values in the connection table used in the label swapping operation are initialized at the connection set up time. The SRH field is derived from a specific field in a connection set-up message, and the label L2 is selected by the receive adapter of the next node of the route. The label L2 is then used to build the ATM header by mapping the L2 bits into the most significant bits of the Virtual Path/Virtual Channel used on the switch. The switch routing header SRH and the ATM header are passed to the switch interface R_SIA along with the VL packet. In other words, they are both used to "encapsulate" VL packets.

The routing of VL packets using a tree routing mode is very similar to the routing of packets using label swap routing mode. In this case, the connection table look-up operation provides a switch routing header (SRH) and an ATM header. The values in the connection table are initialized by the tree management function. The SRH is used to address a multicast table in the switch. Again, switch routing header and ATM header are passed to the switch routing interface R_SIA along with the packet, and the bit 1 of control byte is set to zero.

Figure 6:
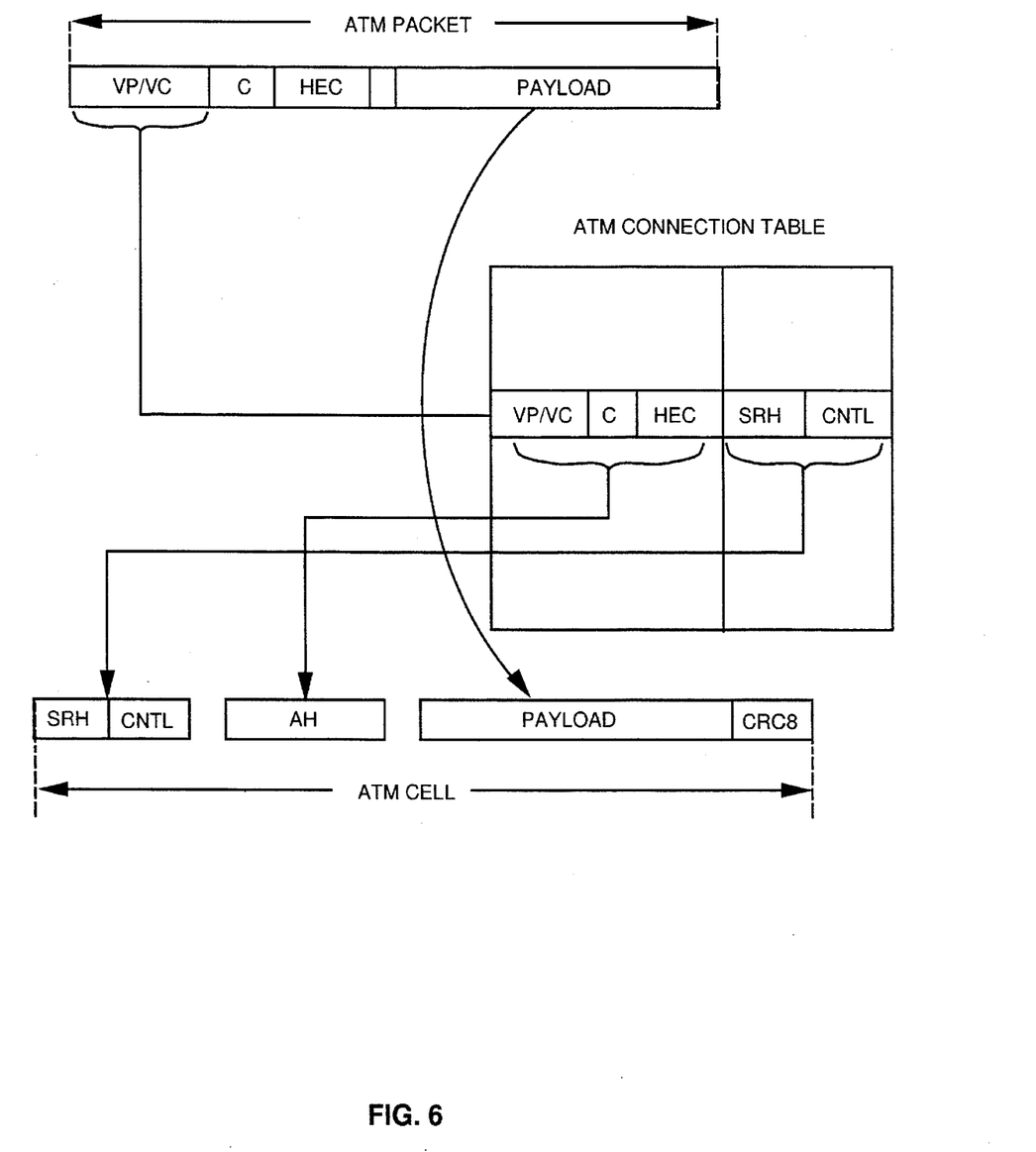

An ATM packet transported either on an ATM trunk or on a VL trunk normally consists of a 5 byte long header and a 48 byte long payload (i.e., end user data). The normal ATM header includes a VP/VC field (4 bytes including 4 control bits) and the 1 byte long HEC. The VP/VC field is used to address an ATM connection table, which table is initialized and updated (if required), by the General Purpose Processor (GPP) attached to the R_TPA (41) or R_ATM (45). The ATM connection table addressing returns new values for the VP/VC field (with its control) and HEC field. The table look-up operation also provides switch routing header (SRH) and control (CNTL) data. This information is attached to the ATM header of the packet being processed. The only additional information that must be appended to an ATM cell to create a switchable cell suitable for the Node Switching Device SW (44) is a one byte long CRC (i.e: CRC-8) character. This character is computed in the R_SIA (43, 46) and appended to the packet. These operations are illustrated in FIG. 6.

Network control packets are treated differently from data packets, as follows. Where a network control packet is received on a VL trunk, the control bytes CB1 and CB2 are used to indicate the nature of the packet and are also used to address various control functions (connection set-up, bandwidth management, label management, topology update, directory queries, etc. . . . ) to be performed at the node. Where a network control packet is received on an ATM trunk, the control packets are segmented into ATM packets which are sequentially transmitted on a reserved Virtual Channel (VC) for each Virtual Path (VP)

Control packets are processed the same way as data packets. In short, the R_TPA processor implements the basic routing operations and generates an ATM header to be used by the switch interface to route the cells. The only difference between the processing of control packets and data packets is the way the ATM label is selected.

The Receive Switch Interface Adapter (R_SIA) may operate either in VL mode when it is connected to a R_TPA (41) or in ATM mode when it is connected to an R_ATM adapter (45).

In VL mode, the switch interface R_SIA (43) receives VL packets (which may include ATM traffic) already described above. Each VL packet has already been provided with the VL payload along with the switch routing header SRH, the control field content CNTL, and the AH field content in the R_TPA adapter. Basic functions are then performed. A "segmentation" function breaks the VL packet payload into ATM-like payloads, Additional functions include generation of a cell HEC field and a cell CRC character.

More particularly, the segmentation function requires that the switch interface (R_SIA) segment the VL packet payload into 48 byte long data units. The switch interface (R_SIA) also builds a complete packet 53 bytes long for each 48 bytes of data by concatenating the data and the ATM-like header. Each complete packet is passed to the switch, along with the switch routing header and the control byte, as a switchable cell. A specific field is set for the last cell (identified by one bit in the header) of a series of segmented cells generated from a VL packet. The last cell includes, in addition to the remaining VL payload (last segment), padding bits, the number of payload bytes, and a 4-byte long CRC (i.e. CRC-32) covering the whole packet payload and padding. The CRC-32 is generated by the interface and is appended to the last cell.

As far as HEC generation is concerned, the HEC field is generated by the interface, for each ATM cell, according to ATM standard specifications. In other words, the HEC value is a predefined function of the AH field. Finally, the interface computes a one byte long CRC which provides error checking for the switch cells making up the VL packet, and appends the CRC character to the last cell in the series.

In ATM mode, the switch interface (46) receives ATM cells along with a switch routing header SRH and a control byte (CNTL) from the R_ATM adapter (45). A one byte long cell CRC is then generated and appended to the cell.

The switchable cells, whatever be their origin (be it VL traffic or ATM traffic), can all be routed through the switch (SW 44) in the same manner and can be directed toward the proper transmit switch interface adapter X_SIA (47 or 49). The interface transmits the switchable cells to the transmit adapter through a FIFO buffer which compensates for data bursts.

The transmit switch interface adapter X_SIA (47, 49) may either operate in VL mode when it is connected to a TPA (48) or in ATM mode when it is connected to an ATM adapter (50). Both modes may include both ATM traffic and VL traffic. Both modes are described hereunder. One bit position in the header control field CNTL permits discrimination between ATM and VL (i.e. VL) traffic. In the case of a transmit adapter attached to an ATM output trunk (i.e., X_ATM 50), any reassembled VL packet should be re-segmented and processed into ATM-like packets prior to being fed into said ATM output trunk.

In VL mode and ATM mode, the switch interface X_SIA implements cell validity checking and packet reassembly operations. The validity checking consists in computing the CRC-8 of the received ATM cell and comparing this computed value to the CRC-8 carried by the cell. If the values match, no error was introduced by the switch. If a CRC mismatch is found, the cell is simply dropped. Once the cell has been checked and found to be valid, its control byte bit 1 is checked to determine whether the cell should be directly passed to the transmit PTA (X_PTA 48) or should be submitted for reconstruction or reassembly of the original VL packet. For each packet undergoing reassembly operation, the transmit processor will have stored the ATM cell header which had been used for the switching of all the cells containing packet payloads.

Additional operations include: packet reassembly, routing and finally queuing and thresholding. The packet reassembly operation, performed in the specialized processor of the transmit TPA, recombines split VL packets to re-create their original form. Multi-user reassembly requires saving and restoring intermediate results like byte alignment parameters, partial CRC-32 as explained below, etc. . . Reassembly data is stored in the special processor local (X_P3) store and passed to the X_SIA at appropriate time, or entirely operated in the special processor. A cell reassembly table and buffer governs the process. This table is addressed by a portion of the AH field of the incoming cell, and contains, for each user, information on data alignment of the last word, pointer, status and buffer chaining.

The reassembling is implemented in two steps. At break-in time, the special processor (X_P3) of the X_TPA uses some information in the table to reassemble the cells for each user into buffers. While in background process, chaining information is used to chain all buffers containing data from the same packet and for the same user.

More particularly, a 2-byte long portion of the first cell AH is used as a pointer which addresses a file of control blocks in the local memory of the special processor which returns a "partial" 4-bytes long (i.e. CRC-32) and a queue pointer where the 48 payload bits of the cell undergoing processing shall be stored (together with the header). When the next cell belonging to the same VL packet is received, the pointer enables again getting the partial CRC-32 and the queue pointer. The CRC-32 is updated using a conventional CRC generating algorithm for updating the last partial CRC with the current payload. The queue pointer is used for payload concatenation. When the last packet is received and processed, the CRC-32 should be completed and the whole VL packet be reassembled. It may then be checked for validity.

Once the VL packet has been reassembled in the buffer store, the specialized processor X_P3 in X_TPA (48) decodes the CB1 byte to determine the routing mode and corresponding dispatching. If the routing mode involves label swapping, the processor extracts the L2 label from the ATM header, stores it in a VL routing field of the header, and updates the header control word.

ATM traffic is identified by the control byte. The X_TPA transforms the ATM cell into a VL type packet by inserting a specific 4-bit pattern in the four first bits of the ATM cell. This field is called the Generic Flow Control (GFC) field and is defined by the ATM Standard bodies as being available within the network (the standard specifies that this field is used at the User to Network Interface (UNI)). Decoding of the four first bits of the VL packet at the R_TPA can further indicate whether this packet is a true VL packet or a native ATM packet. The X_TPA then computes the HEC which is stored in the header field of the ATM cell.

If the transmit TPA (X_TPA) handles several output links, then additional routing operations are implemented for all routing modes. They are basically the same as those implemented in the receive TPA adapter.

Network control packets are detected the same way as at the Receive_TPA and, if required, such packets are transmitted to the General Purpose Processor (GPP) assigned to network control processing operations.

Finally, prior to being passed to the output line or trunk, the traffic may be submitted to multiple class queuing (see, for instance, the above referenced European Application) and thresholding operations required for management of each user's reserved bandwidth. The information derived for such operations is used for monitoring the node output traffic.

The Receive ATM and Transmit ATM adapter functions are basically the same for both VL trunks and ATM trunks and might also be combined into a same unit, respectively, for both trunks. Also, the unit might be simplified if only ATM or VL trunks are connected to the node under consideration.

The following functions are implemented in the receive ATM adapter: HEC checking, traffic discrimination and routing.

HEC checking is a conventional validity control operation involving HEC computation, matching the computed value against the incoming HEC, and in case of mismatch, discarding the corresponding cell.

Traffic discrimination distinguishes between data traffic and network control and management traffic. The network control and management cells are directed toward a general purpose processor (GPP) attached to the receive ATM adapter.

The X_ATM adapter captures and reassembles control packets, if any, in the associated general purpose processor. Also, as already mentioned, any reassembled VL packet should be resegmented into ATM-like packets if being fed into the ATM output trunk or line attached to said X_ATM(50).

Figure 7:
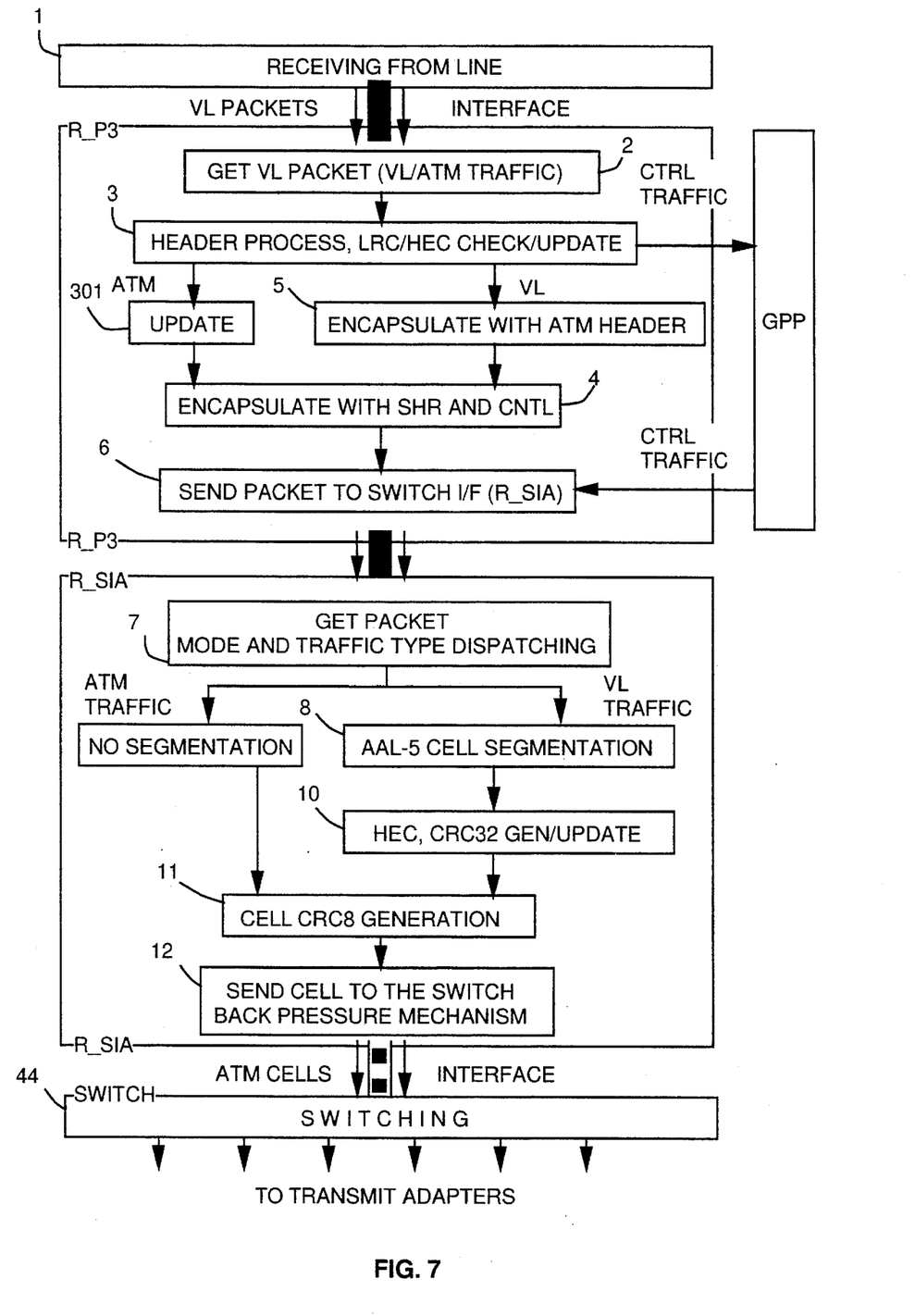
FIGS. 7 through 10 are flow charts illustrating the node operations.
Figure 8:
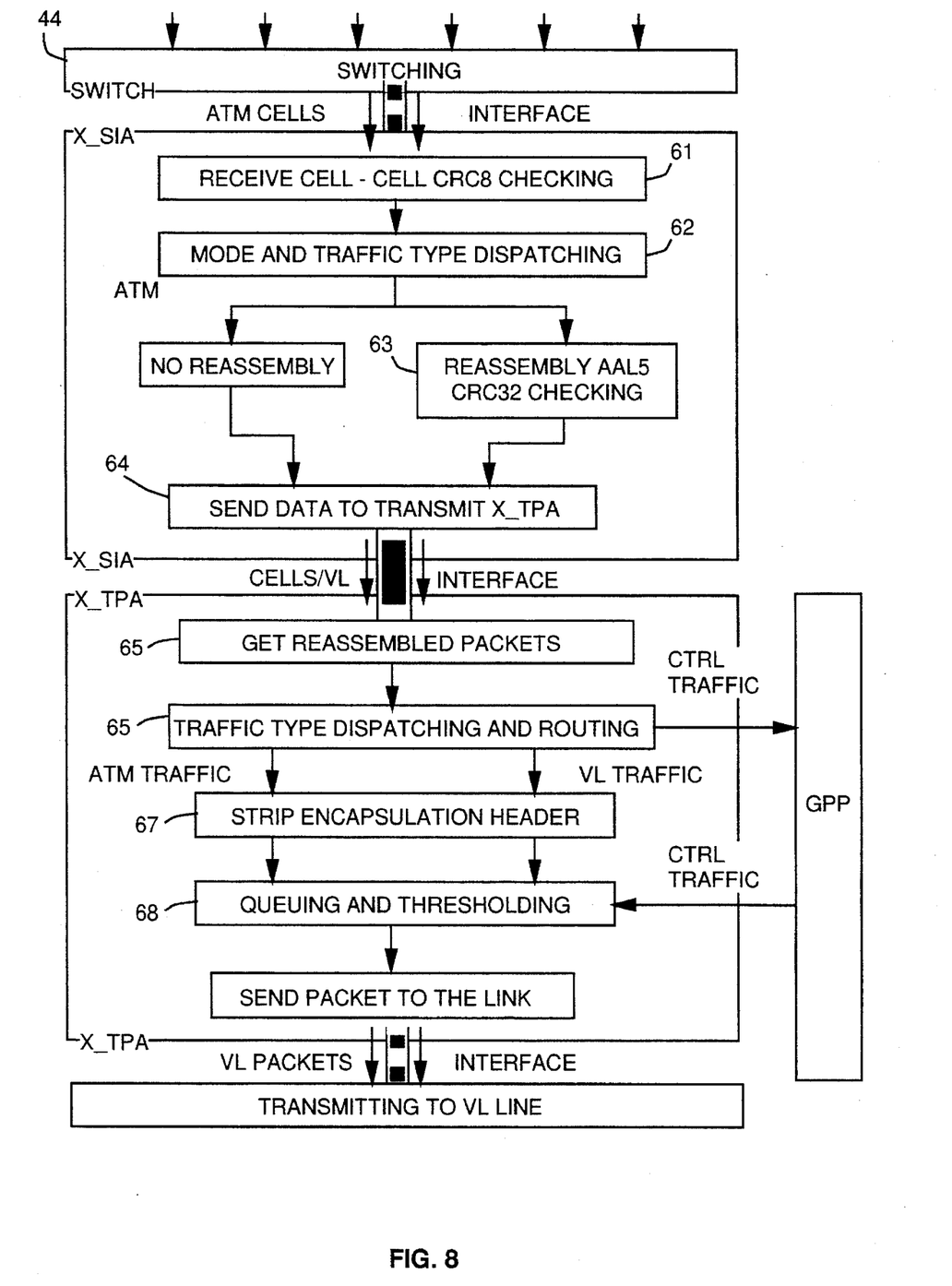

The above described general receive and transmit data flows have been summarized in FIG. 7 and FIG. 8 respectively. The flowchart of FIG. 7 represents the general receive data flow implementing the function of R_TPA (41) and R_SIA (43, 46). It starts with receiving the variable length traffic (possibly including ATM packets) from the line (steps 1 and 2). Then the header is processed (step 3), i.e. for integrity checking through conventional LRC checking (or HEC if ATM) and header updating as already explained in the above description. The header processing also enables detected VL control traffic to be directed toward the general purpose processor (GPP) for being processed therein through CB1/CB2. Should the control traffic not be destined for the immediate node or should it also need to be forwarded through the network, the control data from the general purpose processor is reinserted into the data flow and down to the switch.

Step 3 also involves discriminating between ATM traffic and VL traffic, based on the four bit GFC (i.e. the four first bits of CB1). ATM traffic is routed (see label swapping operation on ATM traffic in FIG. 6) while the ATM header is updated (step 301) through the ATM connection table look-up operation (see FIG. 6) and is "encapsulated" with the calculated SRH and CNTL bytes (step 4). Otherwise the packet being processed is treated as a variable length packet. The so-called "ATM header" is generated through the process involving label swapping and VL connection table look-up, and used to "encapsulate" the considered packet (step 5). The VL connection table look-up is also operated at step 4 (see also FIG. 5) to provide the SRH and CNTL data used in the VL packet encapsulation process. In the preferred embodiment of the invention, the above operations are all performed in the special processor of the R_TPA, which may then send the processed packet to the receive switch interface (R_SIA) (step 6). The R_SIA interface gets therefore encapsulated ATM and/or VL packets (step 7) and dispatches the traffic according to its mode. Should the packet be an ATM packet belonging to operation on either ATM mode or on VL mode (i.e. a packet being designated by the expression ATM-like packet), it is processed as an ATM packet. A variable length (VL) packet within VL traffic is "segmented", (i.e. broken) into ATM-like packets (step 8). As already mentioned, this is performed by segmenting the VL payload into 48 bytes long blocks (or segments) and attaching to each segment the VL packet header plus an HEC computed from the AH field content. The HEC is generated according to ATM specifications (steps 8 and 10). In the preferred embodiment of the invention, the HEC is modified for the last segment, which is identified by a preassigned bit of the AH header. The 4 byte long CRC-32 value is computed and stored for being appended to the last segment of the considered VL packet and for deriving therefrom the last ATM-like packet. For each ATM packet derived from the segmentation operation (i.e. ATM-like packet), or from ATM traffic, the one byte long control word (CRC-8) is also generated at step 11, and appended to the considered cell.

Every such organized, switchable cell may then be forwarded to the switch (step 12), without distinction between cells, except in the case of switch saturation, in which case a so-called backpressure mechanism is triggered. The detailed description of such a mechanism is not necessary for the present invention and therefore shall not be described further herein. One needs only understand that this mechanism shall help handling switch overload conditions. However, for some details on this mechanism, reference may be made to the above mentioned copending European Application.

The architecture of the multipurpose node (as represented in FIG. 4), facilitates the post-switch processing as well as it did for the pre-switch processing (as described above).

The flow-chart of the transmit switch interface adapter (X_SIA) and transmit trunk/port adapter operations described above are summarized in the general transmit data flow of FIG. 8. In the X_SIA, the cells provided by the switch are first checked for validity (step 61) through use of the CRC-8 field, which should then be dropped. Invalid cells are discarded while valid ones are forwarded for dispatching (step 62) based on mode and traffic to be considered. As already mentioned a specific bit of the cell control byte indicates whether the cell should be passed directly (no reassembly) or further processed for reassembling operations (step 63). In the latter operational step, the cells are reassembled into their original packet, along with validity checking for the whole VL packet through the CRC-32 build-up from the cells belonging to the same packet. Briefly stated, starting with the 48-byte long payload of first segment, CRC-32 computation is started. The initial result is stored as a partial CRC value in a local memory control block addressed by a pointer derived from AH header. This partial CRC value is then updated with each intermediate payload of same VL packet, down to the last, and then compared with the CRC-32 stored in the last cell for validity check of the whole VL processed packet.

Recombined packets are passed to the X_TPA special processor (step 64, 65). The incoming packets are then analyzed and dispatched (step 66). The dispatching includes forwarding control traffic to a general purpose processor (GPP) which may further forward the information to the output line via queuing and thresholding operations (step 68). Non-control traffic is also sent to queuing and thresholding (step 68) after being first stripped from encapsulation header (step 67).

The packets are queued, possibly into several queues in case of multiple class queuing, e.g. based on priority criteria depending on the type of traffic involved. And thresholding operations may be performed in step 68 to assure compliance with each user's reserved bandwidth. This criteria has been used to optimize the network operation, bearing in mind that each user may apply for a predefined bandwidth depending on its expected traffic load.

Figure 9:
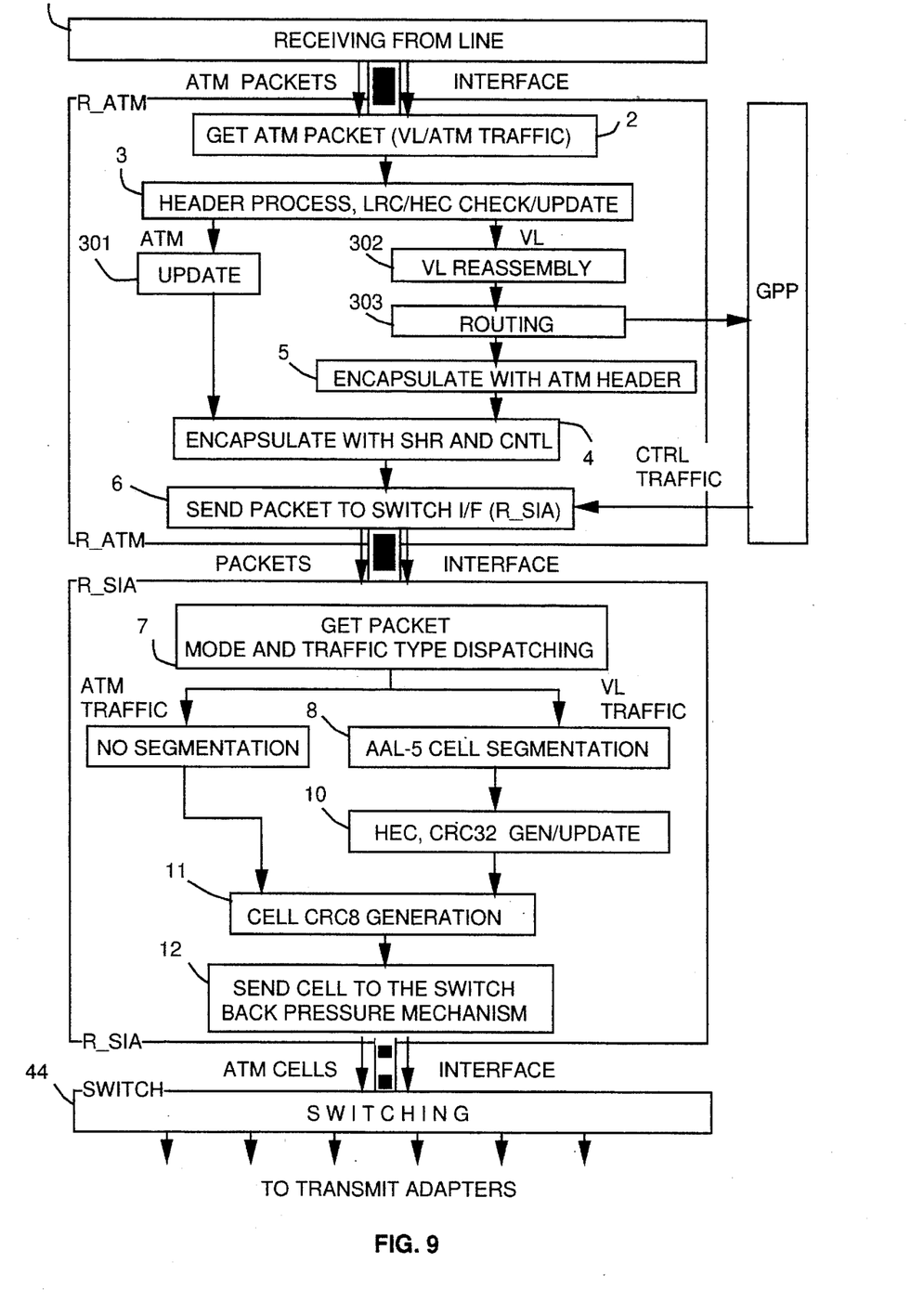

FIG. 9 represents the operating flow chart of the R_ATM (45). Some of the involved steps operate exactly as they did in the R_TPA (41 in FIG. 4) and have accordingly been labeled with the same references given in FIG. 7. The only important difference lies in the requirement for reassembling the received ATM-like packets into their original VL packet form (step 302) for being routed toward the General Purpose Processor (step 303), prior to being encapsulated with an ATM header (step 5). Control traffic is distinguished from data traffic based on the CB1/CB2 field contents. This last operation is performed in the routing of step 303.

Figure 10:
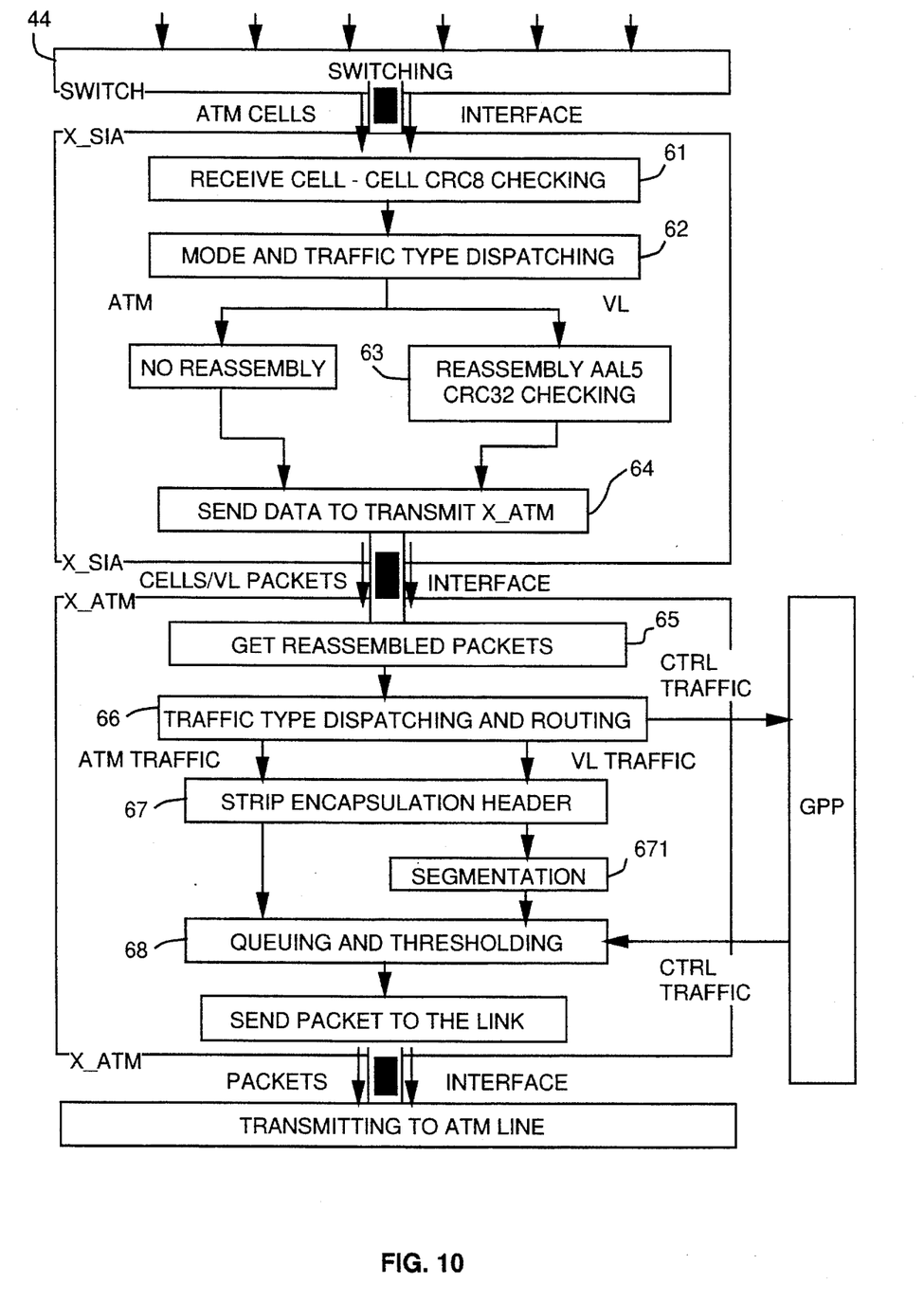

FIG. 10 represents the flow chart of the X_ATM (50) operation. Here again, most operations are similar to those performed in the X_TPA (48) described above with reference to FIG. 8 and have been labeled accordingly. The only differences, are due to the fact that switchable cells derived from VL packets might have been reassembled in the X_SIA (49). Therefore, prior to being transferred to the output ATM trunk, these cells need to be re-segmented, and assigned an ATM header in order to provide ATM-like packets (step 671) transmissible over an ATM output trunk.

Figure 11:
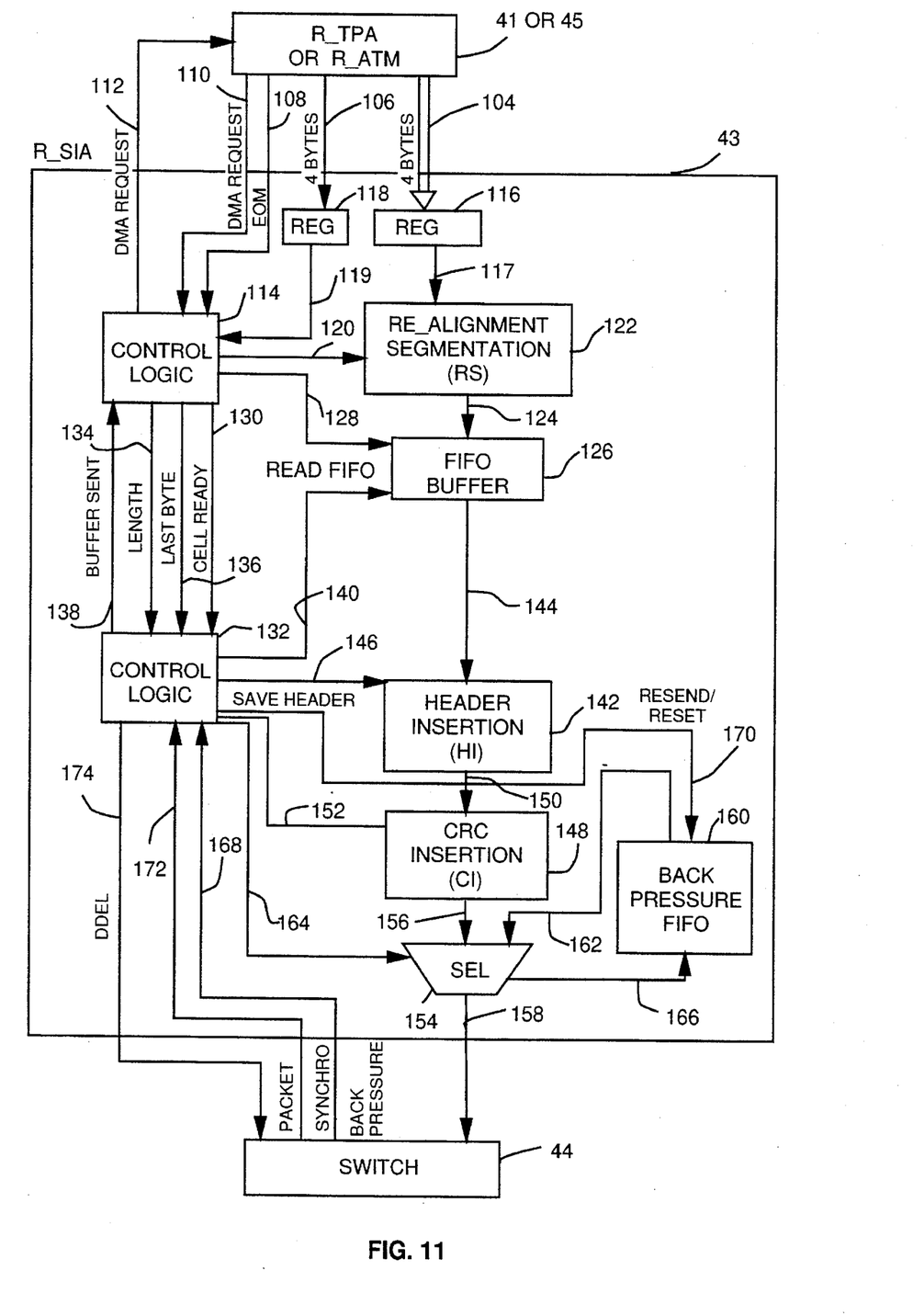
FIG. 11 shows a physical implementation of the R_SIA boxes 43 or 46 of FIG. 4

FIG. 11 describes a physical implementation of the R_SIA boxes 43 or 46 of FIG. 4 when interfaced to the R_TPA box 41 or the R_ATM box 45. As mentioned, the R_SIA box processes variable length packets sent by the R_TPA box 43 or ATM cells sent by the R_ATM box 45. The R_TPA box 43 and the R_ATM box 45 mainly comprise a memory and a microprocessor MP with its own internal clock. The DMA interface between the R_TPA or the R_ATM memory and the R_SIA boxes comprises a 4 byte data bus 104 for providing the data read from the R_TPA or the R_ATM memory through DMA access and a four bit companion bus 106 where each bit is related to one byte in bus 104. A byte sent on bus 104 has to be processed by the R_SIA box if the corresponding BYTE SELECT bit in bus 106 is on. The interface further comprises one bit EOM line 108 conveying a bit set ON by R_TPA box 41 or the R_ATM box 45 when the bus 104 conveys the last byte of the message being currently processed; furthermore two lines DMA REQUEST 112 and DMA RESPONSE 110 control the DMA access.

In the R_SIA box, control logic 114 activates the DATA REQUEST signal on line 112 to the R_TPA box 41 or the R_ATM box 45 which sets the DMA RESPONSE signal on line 110 and sends the data on buses 104, 106 and possibly 108 in the same MP clock cycle.

The data bytes sent on bus 104 and the BYTE SELECT bit on bus 106 are stored in registers 116 and 118 respectively. The BYTE SELECT bits are provided from register 118 to control logic 114 on line 119 which generates therefrom a realignment/segmentation command on line 120 towards a REALIGNMENT and SEGMENTATION (RS) box 122; this RS box is composed of multiplexors and registers. Data is read from data register 116 and provided to RS box 122 on line 117. This box provides, on a four byte output bus 124, data realigned on a word boundary and grouped to form the future cell's payloads. Data sent by RS box 122 over bus 124 are four byte words except the last word of the cell payload which may contain less than four valid bytes. When the packets to be processed by the R-SIA box are fixed length ATM cells, instead of issuing a realignment/segmentation command, the control logic 114 sends a realignment command to the RS box 122. Upon reception of this command the RS box 122 realigns the 4 byte words before sending the data to the FIFO buffer without a segmenting operation (one packet for one cell).

Data from RS box is written into a FIFO buffer 126 under control of an ENABLE WRITE signal on line 128 provided by control logic 114 to the FIFO buffer 126 and at the rate of MP clock. The FIFO buffer 126 is organized in two pipelined buffers of 57 bytes each: the RS box fills the first buffer until a complete cell data payload is stored; control logic 114 then sends a new ENABLE WRITE signal on line 128 to the FIFO buffer 126 and simultaneously sends a CELL READY signal on line 130, a BUFFER LENGTH (6 bits) signal 134 and a LAST BYTE signal 136 if the FIFO buffer ready to be sent contains the last byte of the initial packet to be switched, to a control logic 132. In response to the new ENABLE WRITE signal the FIFO buffer 126 will restart receiving realigned data in its second buffer until a new data payload is ready. This simultaneous filling of the second buffer will insure that cells can be continuously transmitted to the switch without any dead time. The RS box 122, the control logic 114 and the WRITE FIFO buffer part of the FIFO buffer follow the clock cycles of the MP internal clock.

The control logic 132 controlling the following process of cell preparation will send back on line 138 a BUFFER SENT signal to control logic 114 when a current buffer filled with a cell payload has been processed. This BUFFER SENT signal will gate the CELL READY signal 130 sent by control logic 114: the transition active-disable of CELL READY signal 130 resets the BUFFER SENT signal on line 138; the transition active-disable of BUFFER SENT signal 138 is used by control logic 114 to update an internal register which provides the CELL READY signal 130.

The control logic 132 sends on a line 140 a READ FIFO signal which is received by the FIFO buffer. When receiving the READ FIFO buffer, the buffer which is ready is sent on a line 144 to a HEADER INSERTION (HI) box 142. The control logic 132, the reading part of the FIFO buffer 126 and the HI box 142 are following the same cycle of the internal clock of switch 44. The HI box 144 reads the 4 byte words sent by the FIFO buffer 126 containing a cell payload and builds the corresponding cell by adding a 9 byte header to each cell payload sent by the FIFO buffer 126 and read in the first cell payload of a packet. The 9 byte header is saved by the HI box 142 upon reception of the SAVE HEADER command 146 that the control logic 132 sends on line 146 at each beginning of packet transmission. In the case where the packets to be processed by the R_SIA box are fixed length ATM cells, the control logic 142 instead of sending a SAVE HEADER command, sends a NO HEADER command to the HI box 142 on the line 146. Upon reception of this command, the HI box 142 does not save either insert packet header and lets the one cell transparently cross the box.

The HI box 146 further splits the incoming 32 bit plus header into 8 bit words and sends them to a CRC INSERTION (CI) box 148 on a line 150. The CI box 148 computes the ATM CRC-32, the packet length and a CRC-8 field for each cell. Upon reception of an INSERT command sent on line 152 by the control logic 132 to the CI box 148, the CRC-8 code is added to any cell and two control bytes, the length of packet and ATM CRC-32 code are inserted at the end of the last cell of the packet. The data is then sent byte per byte on the line 150. In the case where the packets to be processed by the R_SIA box are fixed length ATM cells, the control logic 142 instead of sending an INSERT command, sends a CRC ONLY command to the CI box 146 on the line 152. Upon reception of this command, the CI box 146 only computes and insert the CRC-8 before sending the data on line 156.

The selector box (SEL) 154 which is a multiplexor sends on line 158, either the data sent to it by the CI box 148 on line 156 or the data sent by a BACK PRESSURE FIFO buffer (BP) 160 on line 162 depending on the reception of a SELECT BP signal or not sent by the control logic 132 on line 164 to the SEL box 154.

The data sent by the SEL box 154 to the switch 44 is also sent on line 166 to the BP FIFO buffer 160. This box receives and saves the data until the end of the cell (58 bytes) and reset it at the end of the cell upon reception of a RESET signal sent by control logic 132 to the BP box on the line 170, except if a BACK PRESSURE signal is sent by the switch 44 on line 168 to control logic 132 which then sends to the BP box 160 a RESEND signal on line 170. Upon reception of RESEND signal, the BP FIFO buffer 160 re-sends on line 162 the cell stored to the SEL box 154. As for the control logic 132, the reading part of the FIFO buffer 126 and the HI box 142, the CI, SEL and BP boxes are running with the same clock signal from the switch 44.

The control logic 132 starts transmission of cells on reception of two contiguous PACKET SYNCHRO signals on line 172 sent by the switch 44 at fifty-eight cycles interval (one cell time). The objective is to insert cell transmission in the continuous stream of cell time slots provided by the PACKET SYNCHRO signals sent by the switch at 58 cycle intervals. Cell transmission is halted when two contiguous PACKET SYNCHRO signals at 58 cycles intervals are missing. A data delimiter (DDEL) signal is sent on line 174 by the control logic 132 to the switch 44 at each beginning of a new cell transmitted on line 158 by the SEL box 154. The DDEL signal set ON advises the switch there is a cell to process.

While there has been described what is considered to be a preferred embodiment of the invention, variations and modifications in that embodiment will occur to those of ordinary skill in the art once they become aware of the inventive concepts. Therefore, it is intended that the appended claims shall be construed to include both the preferred embodiment and all such variations and modifications as fall within the true spirit and scope of the invention.

What is claimed is:

1. For use in a data communication network having a plurality of nodes and a plurality of trunks for transporting fixed length packets and/or variable length (VL) packets between the nodes, a multipurpose switching node for switching fixed length or VL packets from any input trunk to any output trunk, said multipurpose switching node comprising:

a) a multiport switching device having multiple inputs and multiple outputs, said switching device being capable of switching a fixed length cell having a predefined format received on any of said inputs to any of said outputs as a function of address information contained in the cell;

b) one or more receive adapters, each being connected to one of the input trunks to the node and to one of the input ports of the multiport switching device, for receiving either fixed length packets or VL packets and each comprising:
1) a cell discriminator for identifying the format of each received packet,
2) a format converter connected to the input trunk and to said cell discriminator for converting each received packet to one or more fixed length cells, each having the predefined format, 3) means for directing each fixed length cell to an input port of said multiport switching device, and c) one or more transmit adapters, each being connected to an output port from said multiport switching device and to at least one output trunk and including means for receiving fixed length cells switched by said multiport switching device, each said transmit adapter further comprising:

1) means for detecting the desired format of the output packet which is to be based on the fixed length cell and the identity of the output trunk on which the packet is to be transported from the node, 2) a format converter for converting one or more of the switched fixed length cells to an output packet having the desired format, and 3) means for directing the produced output packet to the identified output trunk.

2. A multipurpose packet switching node as defined in claim 1 wherein the format converter in each receive adapter further includes:

a) means for converting each received packet into a series of one or more fixed length cells, each cell having a five byte header and a forty-eight byte data payload; and b) means for creating cells having the predefined format required by the multiport switching device by appending one or more fields to each of the fixed length cells, at least one of appended fields including switch routing information and another of said fields including a CRC character having a value dependent upon the contents of the cell to which it is appended.

3. A multipurpose packet switching node as defined in claim 2 wherein the node includes one or more general purpose processors and each receive adapter further comprises:

a) a detector for identifying a received packet having network control data;

b) means responsive to address information in a received packet having network control data to direct that packet either to one of the general purpose processors or to the format converter for the receive adapter.

4. A multipurpose packet switching node as defined in claim 3 wherein each receive adapter further includes a back-pressure mechanism for controlling the rate at which cells are applied to the multiport switching device where a possible switch overload is detected.

5. A multipurpose packet switching node as defined in claim 3 wherein each receive adapter further includes a segmenting circuit for receiving a VL packet and segmenting the payload of that packet into one or more fixed length payload segments.

6. A multipurpose packet switching node as defined in any of claims 1 through 5 wherein each transmit adapter further includes thresholding means for controlling the delivery of packets from the node to the output trunks as a function of network congestion.

\* \* \* \* \*